Patented Nov. 22, 1949

2,489,139

UNITED STATES PATENT OFFICE 2,489,139

PRODUCTION OF DISILOXANES

James Franklin Hyde and William Herbert Daudt, Corning, N. Y., assignors to Corning Glass Works, Corning, N. Y., a corporation of New York No Drawing. Application February 21, 1946, Serial No. 649,386

5 Claims. (Cl. 260—448.2)

The present invention relates to new methods for the preparation of unsymmetrical hexaorganodisiloxanes.

This application is a continuation-in-part of our co-pending application Serial No. 481,153, filed March 30, 1943, and assigned to the assignee of the present invention, now abandoned.

The hexaorganodisiloxanes are a class of organosiloxanes in which two triorgano-substituted silicon atoms are linked together by an oxygen atom, and in which the organic substituents are attached to the silicon by silicon to carbon bonds. This type of siloxanes has also been referred to as ethers and as triorganosilicon oxides. The symmetrical hexaorganodisiloxanes are known in the art, and may be prepared by the hydrolysis of triorgano silanes in which the silicon also carries a hydrolyzable group, such as a chlorine or alkoxy group. For example, hexaethyldisiloxane $(C_2H_5)_3Si-O-Si(C_2H_5)_3$ may be prepared by the hydrolysis of triethyl silicon chloride and condensation of the hydrolyzate. Other symmetrical hexaorganodisiloxanes may be prepared similarly as, for example, symmetrical tetramethyldiphenyldisiloxane

$C_6H_5(CH_3)_2Si-O-Si(CH_3)_2C_6H_5$ and hexamethyldisiloxane

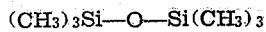
$(CH_3)_3Si-O-Si(CH_3)_3$

For brevity in representation, radicals are abbreviated as follows: methyl as Me, ethyl as Et and phenyl as Ph.

The unsymmetrical hexaorganodisiloxanes are characterized by the two silicon atoms of the molecule being differently substituted. Thus, an example of this type of material is 1, 1, 3-trimethyl-triphenyldisiloxane

$(MePh_2Si-O-SiMe_2Ph)$

The unsymmetrical disiloxanes have properties similar to the symmetrical disiloxanes, and are adapted to the same uses, such as temperature control and heat exchange media. They provide a wide range of materials for such uses and may be employed either alone or in mixture.

An object of the present invention is to provide methods for the preparation of unsymmetrical hexaorganodisiloxanes.

In accordance with the present invention two differently substituted symmetrical hexaorganodisiloxanes, in which the organic groups are attached to silicon by carbon to silicon bonds, are interacted by maintaining an alkali in intimate contact with a mixture of the two. The product of interaction contains substantial proportions of unsymmetrical disiloxane in which the two silicon atoms are substituted as in the two symmetrical disiloxanes respectively.

In the present process, the alkali which is employed preferably is an alkali metal hydroxide, such as sodium or potassium hydroxide, due to the commercial availability of these materials. Other strong alkalies, also, are capable of effecting the present interaction, such as the quaternary ammonium hydroxides, for example, benzyltrimethylammonium hydroxide. The obtaining of the desired interaction of the disiloxanes is not dependent upon the use of a critical amount of the strong alkali. Thus, it has been found that siloxanes function ionically with as small amounts of alkali as 7000 atoms of silicon per molecule of alkali and also when the alkali present is more than equivalent to the silicon present. It is preferred, however, that the strong alkali be employed in amount less than equivalent to the silicon present (Na/Si<1), though with larger amounts the interaction can be effected by also having water present. The presence of water prevents the entire mixture from going to salts of the triorganosilanols, inasmuch as these salts are very readily hydrolyzed.

Water may be present in any instance, though it is preferably limited in amount to not over 1.5 times the amount of alkali employed, by weight, in order to obtain rapid reaction.

Polar solvents such as alcohol may be present, if desired, though their presence, or the amount thereof, is not critical in the present process.

The process hereof may be effected at room temperature or at either reduced or elevated temperatures, the primary difference being the rate of reaction. As is known, when the temperature of a siloxane is sufficiently elevated, cleavage of some of the organo radicals from the silicon atoms occurs. In case the process hereof is operated at temperatures sufficiently elevated to cause cleavage of this character, the resultant product contains some siloxanes which include diorgano siloxane units in mixture with unsymmetrical hexaorganodisiloxanes. These may be separated, if desired, by distillation or other suitable fractionation.

The process of the present invention is applicable broadly to the interaction of differently substituted hexaorganodisiloxanes. Since the active portions of the molecules in the present process are the silicon-oxygen bonds, and not the organic radicals, the process hereof is applicable to siloxanes containing a wide variety of organo groups. The groups present may be alkyl radicals of, for example, 1 to 18 carbon atoms per alkyl; aryl radicals, such as phenyl, tolyl and xenyl; aralkyl radicals, such as benzyl; alicyclic radicals, such as allyl and methallyl. The siloxanes employed may contain a number of different substituents. Thus, the process hereof is applicable to the interaction of symmetrical tetramethyldiphenyldisiloxane with hexamethyldisiloxane to produce pentamethylphenyldisiloxane.

The reaction product is a mixture of disiloxanes. This mixture will contain portions of the reactants together with the unsymmetrical disiloxane which is produced. In order to obtain the unsymmetrical disiloxane in purified form, the alkali in the reaction mixture may be eliminated by neutralization or otherwise and the disiloxanes separated, as by distillation.

The reaction involved in the rearrangement with which the present invention deals is an equilibrium. The specific equilibrium in any instance will depend upon the particular reactants and upon the specific reaction conditions. Likewise, the reaction conditions including the reaction time determine the extent of interaction, i. e., the degree to which equilibrium is approached. Thus, at short reaction times the percent of unsymmetrical oxide produced will be lower than at longer reaction times. The fact that the present interaction is actually an equilibrium is demonstrated by the fact that the unsymmetrical disiloxane can be disproportionated under identical reaction conditions to those employed in its preparation, with the production of the two symmetrical disiloxanes.

For a better understanding of this invention, reference may be had to the following examples which should be considered only as illustrative of the method hereof:

Example 1

A mixture was prepared of 7.2 parts by weight (5 mol.) of symmetrical tetramethylidiphenyldisiloxane (B. P. 295° at 760 mm.) and 20.3 parts (25 mol.) of hexamethyldisiloxane (B. P. 98.5° at 760 mm.), one part (.8 mol.) of potassium hydroxide and 23 parts of 95% ethyl alcohol. The mixture formed a single phase. The atomic ratio of silicon to potassium was 17:1. The mixture was allowed to stand for 24 hours at room temperature after which it was neutralized, washed, dried over sodium sulfate and distilled at atmospheric pressure. The first fraction which was obtained contained the excess hexamethyldisiloxane which was employed. Next, there was a plateau at 206° C. at 760 mm. where the unsymmetrical siloxane, pentamethylphenyldisiloxane, was distilled. This product was obtained in quantity sufficient to account for most of the initial symmetrical tetramethyldiphenyldisiloxane, only a small portion of which remained unconverted. The unsymmetrical product was characterized by effecting rearrangement thereof to the two symmetrical disiloxanes. This rearrangement of the siloxane bonds was effected by allowing a mixture of 4.9 parts of the unsymmetrical disiloxane, 0.12 part of potassium hydroxide and 10 parts of 95% ethyl alcohol to stand 20 hours. The mixture was then washed free of alcohol and alkali, dried and distilled. The distillation curve indicated that one-half of the unsymmetrical disiloxane had been reconverted to the two different symmetrical disiloxanes.

Example 2

The procedure of Example 1 was repeated with the exception that benzyltrimethylammonium hydroxide was substituted for the potassium hydroxide. The ratio of silicon to hydroxide on an equivalent basis was 64:1. In this instance the reaction mixture was allowed to stand for 16 hours at room temperature. The same results were obtained in this instance as in Example 1.

Example 3

Unsymmetrical tetramethyldiphenyldisiloxane $Me_3Si—O—SiMePh_2$ was prepared by mixing 75 parts by weight of symmetrical tetraphenyldimethyldisiloxane $Ph_2MeSi—O—SiMePh_2$, 175 parts of hexamethyldisiloxane $Me_3Si—O—SiMe_3$, 7.8 parts of sodium hydroxide, and 77 parts of ethyl alcohol. The mixture was refluxed at 70° C. for two days, after which the clear solution was decanted from solids which had settled. The clear solution was then refluxed with water to hydrolyze any sodium salts which might be present. The mixture was then allowed to stand at room temperature, whereupon a small amount of solid separated, which was removed by filtration. The filtrate was washed with dilute acid and water until neutral, dried with sodium sulfate, filtered and distilled. There was first obtained a cut, amounting to 127 parts, which was the excess hexamethyldisiloxane and which had a boiling point of 98.0–98.5°. The next fraction obtained contained 70.7 parts boiling between 120 and 135° at 2.5 to 3.5 mm. There remained 6 parts of still residue, there having been some mechanical loss in the operation. The second cut was redistilled to obtain the desired tetramethyl- 1,1 diphenyldisiloxane which was found to have a boiling point of 129–129.5° C. at 3.5 mm. and 124.5 to 125° C. at 2.5 mm. Upon analysis this material was found to contain 19.38% and 19.42% Si (calculated for $(C_6H_5)_2CH_3Si—O—Si(CH_3)_3$ $Si=19.59\%$). This compound had a melting point of −60 to −65° C. and was stable under reflux at 285° C. at atmospheric pressure.

I claim:

1. The method of preparing a hexaorganodisiloxane, which comprises interacting two differently substituted hexaorganodisiloxanes in which the organic groups are selected from the group consisting of alkyl and monocyclicaryl radicals, said radicals being attached to the silicon by carbon to silicon bonds, in intimate contact with an alkali metal hydroxide, whereby shifting of the triorgano silicon groups occurs with formation of a hexaorganodisiloxane which contains triorgano silicon groups corresponding to the triorgano silicon groups of the two reacting disiloxanes.

2. The method of preparing an unsymmetrical hexaorganodisiloxane in which the organic radicals are selected from the group consisting of alkyl and monocyclicaryl radicals, said radicals being attached to the silicon by carbon to silicon bonds, which comprises interacting two differently substituted symmetrical hexaorganodisiloxanes in intimate contact with an alkali metal hydroxide, whereby an unsymmetrical hexaorganodisiloxane is formed in which the two triorgano silicon groups correspond to the triorgano silicon groups in the two reacting disiloxanes respectively.

3. The method defined in claim 2, in which the alkali metal hydroxide contained in the reaction mixture is eliminated and the unsymmetrical hexaorganodisiloxane is separated from residual unreacted hexaorganodisiloxanes.

4. The method of preparing unsymmetrical hexaorganodisiloxanes in which the organic radicals are selected from the group consisting of alkyl and monocyclicaryl radicals, said radicals being linked to the silicon by carbon silicon bonds, which comprises interacting two differently substituted symmetrical hexaorganodisiloxanes in intimate contact with an alkali metal hydroxide, whereby an unsymmetrical hexaorganodisiloxane is formed in which the two triorgano silicon groups correspond respectively with the triorgano silicon groups in the two reacting disiloxanes respectively, there being present less than 1 equivalent of alkali metal hydroxide per equivalent of silicon.

5. The method of preparing unsymmetrical hexaorganodisiloxanes in which the organic radicals are selected from the group consisting of alkyl and monocyclicaryl radicals, said radicals being linked to the silicon by carbon to silicon bonds, which comprises interacting two differently substituted hexaorganodisiloxanes in intimate contact with alkali metal hydroxide whereby an unsymmetrical hexaorganodisiloxane is formed in which the two triorgano silicon groups correspond with the triorgano silicon groups in the two reacting disiloxanes respectively, and in the presence of water not in excess of 1.5 times the amount of alkali metal hydroxide by weight, there being less than 1 equivalent of alkali metal hydroxide per equivalent of silicon.

JAMES FRANKLIN HYDE.
WILLIAM HERBERT DAUDT.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,386,441 | Daudt | Oct. 9, 1945 |
| 2,398,187 | McGregor et al. | Apr. 9, 1946 |
| 2,421,653 | Sauer | June 3, 1947 |

FOREIGN PATENTS

| Number | Country | Date |
|---|---|---|
| 552,640 | Great Britain | Apr. 19, 1943 |

OTHER REFERENCES

Kipping et al., Journal Chemical Society (London) 105 (1914), pages 484–500.

Meads et al., Journal Chemical Society (London) 105 (1914), pages 679–690.

Hyde et al., Journal of the American Chemical Society 63 (1914), pages 1194–1196.

Sommer, Journal Am. Chem. Soc., vol. 68 (1946), pages 485–487.

Volnov, "Jour. Gen. Chem.," U. S. S. R., vol. 10 (1940), pages 1600–1604.

Post, "Chemistry of Aliphatic Ortho Esters" (1943), Rheinhold, N. Y., page 134.